H. GOLDSTONE.
NUT LOCK.
APPLICATION FILED OCT. 8, 1915.
1,205,191.
Patented Nov. 21, 1916.
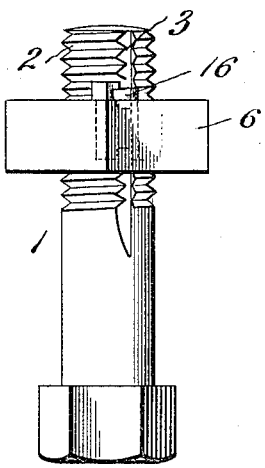
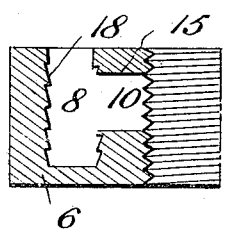
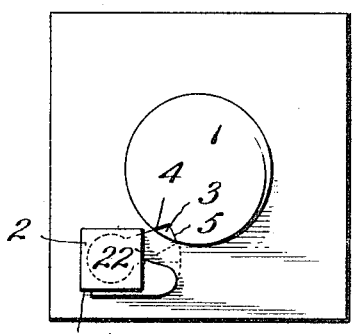
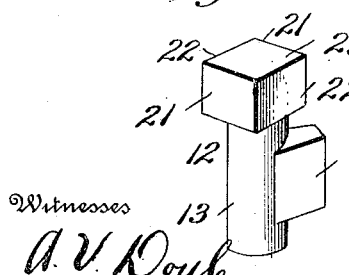
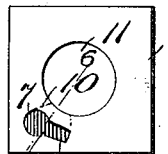
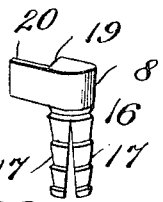
Witnesses
A. V. Doyle
James R. Kaene
Inventor
H. Goldstone.
By Victor J. Evans
Attorney

UNITED STATES PATENT OFFICE.

HARRY GOLDSTONE, OF NEW YORK, N. Y.

NUT-LOCK.

1,205,191.  Specification of Letters Patent.  Patented Nov. 21, 1916.

Application filed October 8, 1915. Serial No. 54,811.

*To all whom it may concern:*

Be it known that I, HARRY GOLDSTONE, a citizen of the United States, residing at New York city, in the county of New York and State of New York, have invented new and useful Improvements in Nut-Locks, of which the following is a specification.

This invention relates to nut locks, and has for its primary object the provision of a device of this character which will include means adapted to be quickly applied to the nut and presented for co-acting engagement with the bolt so as to hold the same positively against retrograde rotation.

Another object of the invention resides in the provision of locking means co-acting with the bolt to hold the nut in any required adjusted position, and a retaining device co-acting with the locking means to insure its active or operative association with said bolt under all ordinary usages of the bolt.

Another object of the invention resides in the provision of a nut locking device in which will be included, as a companion part thereof, means adapted to secure the device against accidental displacement or derangement from the bolt and nut, and formed in order that it may be readily removed from the bolt when it is required that the nut be further adjusted or removed.

In the drawings forming a part of this specification and in which like numerals indicate similar parts throughout the several views: Figure 1 is a side view of a bolt and nut showing the application of the invention thereto. Fig. 2 is a plan view thereof. Fig. 3 is a plan view of the nut. Fig. 4 is a perspective view of the locking device. Fig. 5 is a perspective view of the retainer. Fig. 6 is a section on the line 6—6 of Fig. 3.

In carrying the invention into practice, the bolt 1 herein shown, is provided with a threaded shank 2 having a longitudinally extending groove 3 provided with angular walls 4 and 5. The nut 6 is provided with a substantially key-hole shaped recess having a branch 7 which is circular in cross section and a branch 8, the latter opening into the former as at 9. This nut is further provided with a slot 10 which opens at its outer end respectively into the mentioned branches 7 and 8, while, at the inner end, the said slot opens into the bore 11 of the nut where it is adapted to radially aline with the groove 3 in the bolt shank.

The locking device consists of a key 12 having a shank 13 of a design to freely slide longitudinally in the branch recess 7 in the nut, and a radial lug 14 which is adapted to be freely accommodated in the branch recess 8 so that it may be projected through the slot 10 in the nut and then into the groove 3 in the bolt shank 2. It is seen that when the key is turned to bring the lug 14 into the groove 3, the former will be disposed directly in advance of the wall 15 of the nut 6 in order that the key will be held against outward longitudinal movement in the passage 7. When the key is turned to the position shown in Fig. 2, the nut will be held in a positive manner against retrograde rotation.

In order that the key will be secured in a nut locking position in the nut, use is made of a retainer 16 which consists of a split shank having relatively springing branches 17 which are toothed along their outer surfaces to mate and yieldingly lock with similar teeth 18 in the walls of the branch recess 8 of the nut. The retainer carries a fixed head 18 having angular surfaces 19 and 20 which are adapted to mutually bear against similar co-acting surfaces 21 and 22 on the head 23 of the retainer as will be seen on reference to Fig. 2.

It now follows that after adjusting the nut to the desired position upon the bolt, the key may be inserted into the nut and then turned to cause the lug 14 thereof to be extended into the receiving groove 3 in the bolt. After this operation, the retainer is driven into the branch recess 8 and the surfaces 19 and 20 made to rest against the adjacent angular surfaces of the head 23 of the key. In this manner the key is effectually held against accidental rotation.

The device is positive in action; simple in construction, and designed whereby it may be quickly applied to or removed from the nut and bolt at any desired time, without causing injury to the device itself or to the bolt and nut, and in practice, it is found that the nut will be securely held against any retrograde rotation whatever. When it is desired to release the nut, the retainer is sprung from the branch recess 8 and the key 16 turned to bring the lug 14 thereof into the said recess, whereby it will be disposed beyond the groove 3. The nut is then free to be rotated in either direction, as will be understood.

What is claimed as new is:

1. A bolt having a groove, a nut having a radial passage opening onto the groove, and a recess disposed parallel to the bolt opening in the nut, in combination with a key mounted to rock in the recess and provided with a lug engaging in the groove and movable through said passage, on rotation in one direction of the key, and means removably mounted in the recess and directly bearing against the key to hold the same against rocking movements.

2. A bolt having a groove, a nut having a radial passage opening onto the groove, and a recess disposed parallel to the bolt opening in the nut, in combination with a key mounted to rock in the recess and provided with a lug engaging in the groove and movable through said passage, on rotation in one direction of the key, and means removably mounted in the recess and directly bearing against the key to hold the same against rocking movements, and provided with means for locking engagement with the walls of the recess.

3. A bolt having a groove, a nut having a radial passage opening onto the groove, and a recess disposed parallel to the bolt opening in the nut, in combination with a key mounted to rock in the recess and provided with a lug engaging in the groove and movable through said passage, on rotation in one direction of the key, and means removably mounted in the recess and directly bearing against the key to hold the same against rocking movements, and provided with yieldable means for locking engagement with the walls of said recess.

4. A nut lock for bolts, comprising in combination with a bolt having a groove, and a nut having a recess provided with two communicating branches and a passage opening thereinto between the ends thereof and extending to the bolt opening in the nut, of a key removably mounted in the recess and free to rock therein and provided with a lug adapted to extend into the said groove of the bolt, said lug being freely movable in said passage, and a retainer freely insertible in the other branch of said recess and serving to hold the key against rotation.

5. A nut lock for bolts, comprising in combination with a bolt having a groove, and a nut having a recess provided with two communicating branches and a passage opening thereinto between the ends thereof and extending to the bolt opening in the nut, of a key removably mounted in the recess and free to rock therein and provided with a lug adapted to extend into the said groove of the bolt, said lug being freely movable in said passage, and a retainer freely insertible in the other branch of said recess and serving to hold the key against rotation, the said key having an angular surface, the retainer having a similar angular surface mating with the first surface on operative application of the retainer and key in said communicating branches of the recess.

In testimony whereof I affix my signature in presence of two witnesses.

HARRY GOLDSTONE.

Witnesses:
  ANNA V. DOYLE,
  JAMES R. KOEHL.

Copies of this patent may be obtained for five cents each, by addressing the "Commissioner of Patents, Washington, D. C."